United States Patent [19]

Nakano

[11] Patent Number: 5,033,322
[45] Date of Patent: Jul. 23, 1991

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 509,353

[22] Filed: Apr. 16, 1990

[30] Foreign Application Priority Data

Apr. 25, 1989 [JP] Japan .................................. 1-103447

[51] Int. Cl.⁵ .............................................. F16H 15/10
[52] U.S. Cl. ..................................................... 74/200
[58] Field of Search ................... 74/200, 690, 691, 199

[56] References Cited

U.S. PATENT DOCUMENTS

| | | | |
|---|---|---|---|
| 2,850,911 | 9/1958 | Kraus | 74/200 |
| 3,810,398 | 5/1974 | Kraus | 74/200 |
| 3,820,416 | 6/1974 | Kraus | 74/200 X |
| 4,448,087 | 5/1984 | Barzel | 74/200 X |
| 4,893,517 | 1/1990 | Nakano | 74/200 |

OTHER PUBLICATIONS

Robert W. Carson, "New and Better Traction Drives are Here," Machine Design, Apr. 18, 1984, pp. 148 and 155.

Primary Examiner—Richard E. Moore
Attorney, Agent, or Firm—Foley & Lardner

[57] ABSTRACT

A continuously variable traction roller transmission comprises a first continuously variable transmission unit including a pair of first traction rollers, and a second continuously variable transmission unit including a pair of second traction rollers. The pair of first traction rollers are supported by a pair of first roller support members, and the pair of second traction rollers are supported by a pair of second roller support members. Two links are arranged for preventing relative movement between the pair of first roller support members and the pair of second roller support members.

3 Claims, 5 Drawing Sheets

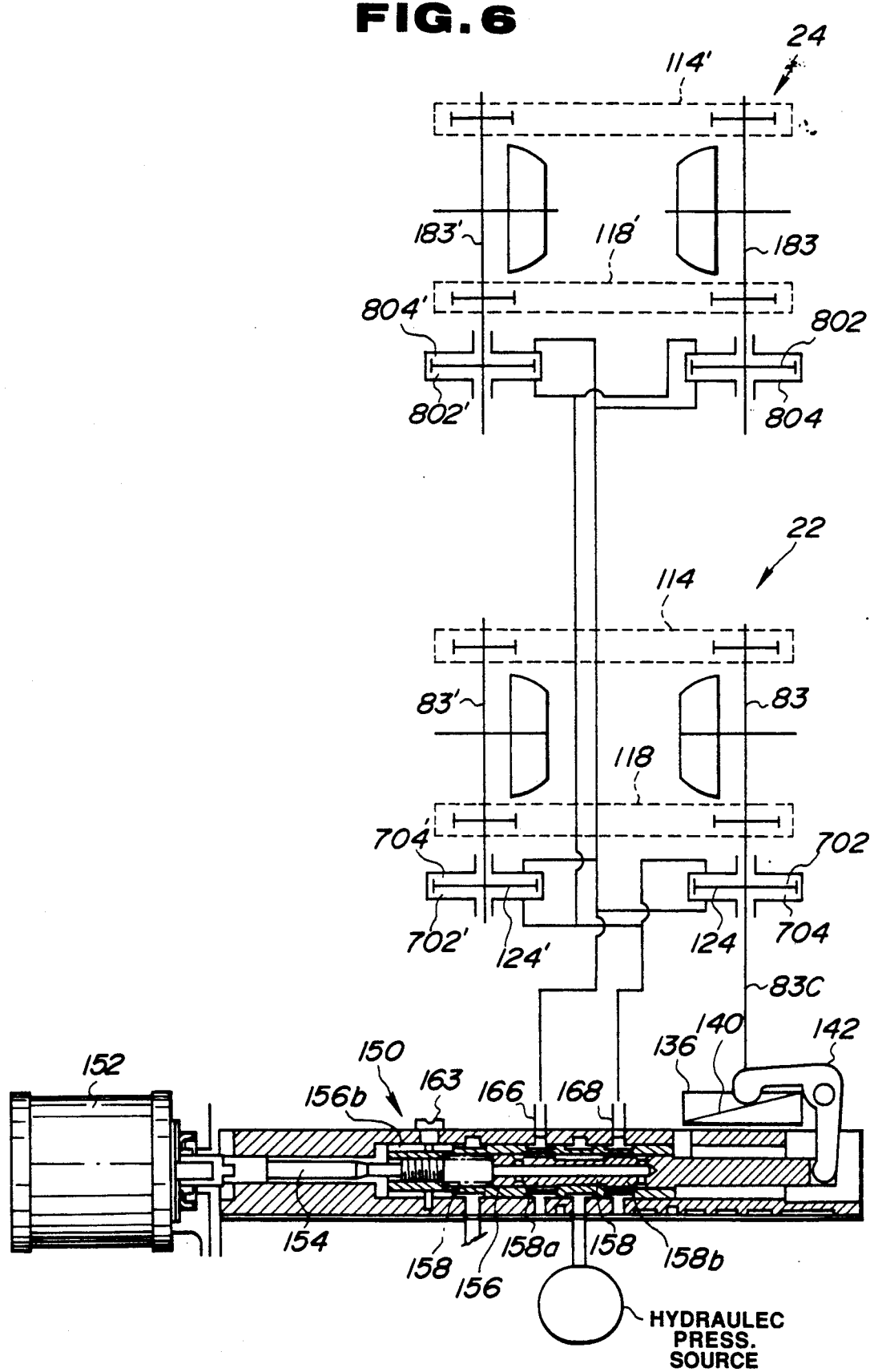

CONTINUOUSLY VARIABLE TRACTION ROLLER TRANSMISSION

BACKGROUND OF THE INVENTION

The present invention relates to a continuously variable traction roller transmission.

A conventional continuously variable traction roller transmission is shown, for example, in the Publication entitled "Machine Design", p. 155, published on Apr. 18, 1984. This transmission includes two continuously variable transmission units. The transmission units comprise two input traction discs, and two output traction discs which are coupled to each other for unitary rotation, respectively. Accordingly, with a shift control valve for one of the first and second transmission units, the two transmission units are controlled.

A problem encountered in such continuously variable traction roller transmission having two transmission units is such that, while the transmission unit is shifting under control of the shift control valve, a pair of roller support members of the other transmission unit are subject to vibration, increasing tendency to induce slippage. Specifically, even though vibration of a pair of roller support members of the transmission unit operated by the shift control valve is hydraulically attenuated, whereas vibration of the other pair of roller support members is not attenuated to a low level. This produces a variation in torque, creating a condition where slippage tends to occur.

SUMMARY OF THE INVENTION

An object of the present invention is to provide a continuously variable traction roller transmission in which vibrations of roller support members are minimized.

Specifically, there is provided, according to the present invention, a continuously variable traction roller transmission comprising:

a first continuously variable transmission unit including first input and output traction discs, and a pair of first traction rollers interposed between said first input and output traction discs for transmitting a torque therebetween;

a second continuously variable transmission unit including second input and output traction discs, and a pair of second traction rollers interposed between said second input and output traction discs for transmitting a torque therebetween;

said first input traction disc being coupled with said second input traction disc, and said first output traction disc being coupled with said second output traction disc;

a pair of first roller support members supporting said pair of first traction rollers;

a pair of second roller support members supporting said pair of second traction rollers; and means for preventing relative movement between said pair of first roller support members and said pair of second roller support members.

BRIEF DESCRIPTION OF THE DRAWINGS

FIG. 6 is a schematic representation illustrating a hydraulic connection of a shift control valve with hydraulic chambers of the first and second continuously variable transmission units.

DETAILED DESCRIPTION OF THE INVENTION

Figure 1:
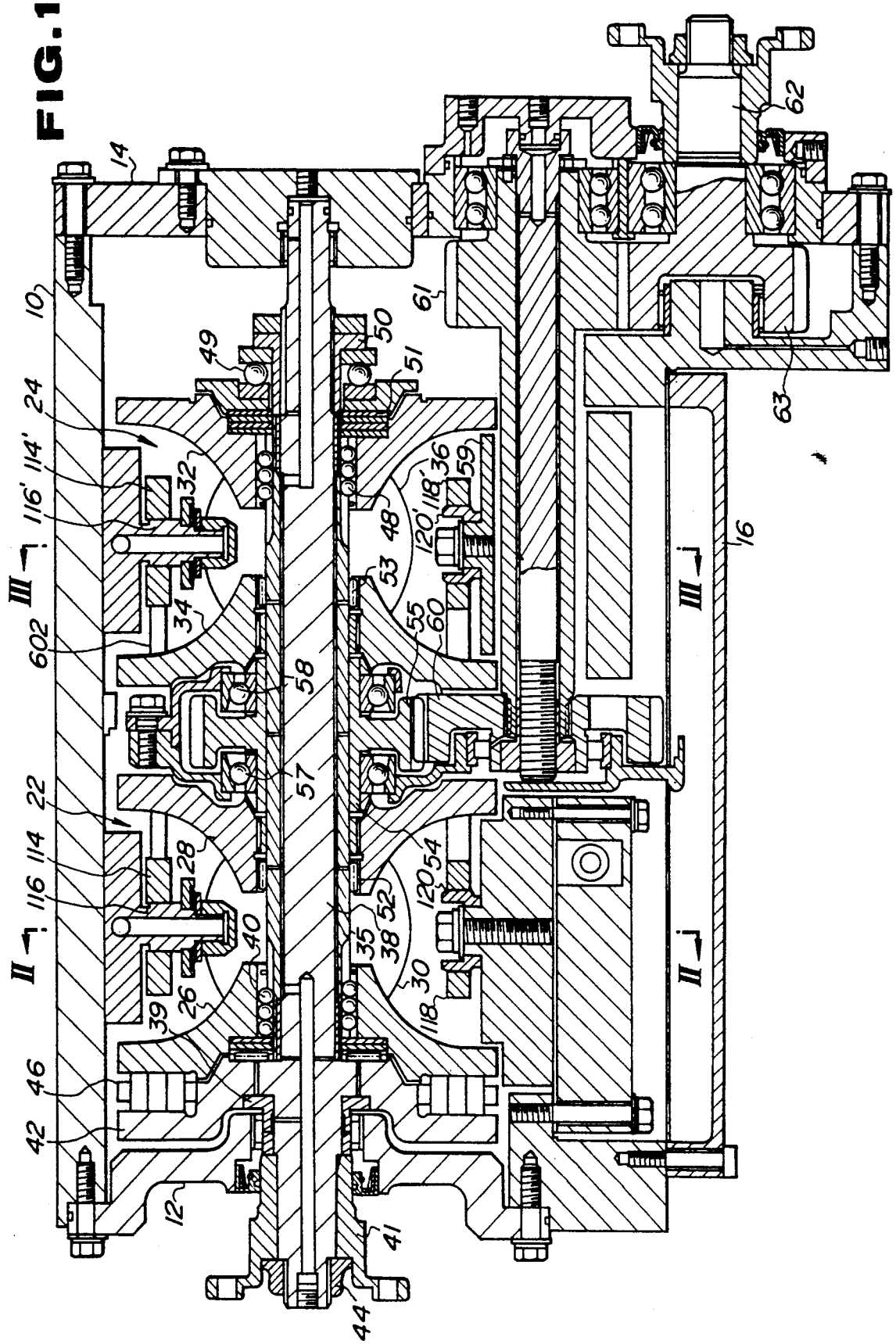
FIG. 1 is a longitudinal sectional view of an embodiment of a continuously variable traction roller transmission according to the present invention.

Referring to the drawings, a preferred embodiment of the present invention is described.

Referring particularly to FIG. 1, a first continuously variable transmission unit 22 and a second continuously variable transmission unit 24 are arranged in a chamber defined by a housing 10. The housing 10 has secured thereto a front flange 12 and a rear flange 14. Secured to the bottom of the housing 10 is an oil pan 16. The first continuously variable transmission unit 22 includes an input traction disc 26, an output traction disc 28, and a pair of traction rollers 30, 30' for transmitting a torque from the input disc 26 to the output disc 28. The input and output traction discs 26, 28 have toroid surfaces which contact with the traction rollers 30, 30'. A speed ratio of the input disc 26 to the output disc 28 is continuously variable by changing conditions of contact of the traction rollers 30, 30' with the input and output discs 26, 28. Similarly, the second continuously variable transmission unit 24 includes an input traction disc 32, an output traction disc 34, and a pair of traction rollers 36, 36'. It is to be noted that the input and output traction discs 32, 34 are disposed opposite to the traction discs 26, 28 of the first transmission unit 22 as viewed in an axial direction of the input shaft 38. That is, the output disc 28 of the first transmission unit 22 is adjacent to the output disc 34 of the second transmission unit 24 as viewed in the axial direction of the input shaft 38. Through a ball spline coupling 40, the input traction disc 26 is supported on a hollow shaft 35 which is arranged around the input shaft 38. The input shaft 38 is coupled with a torque converter (not shown), and receives an engine torque therethrough. A cam flange 42 is arranged at the back of the input traction disc 26, and it is splined to the input shaft 38, thus rotating with the input shaft 38. The cam flange 42 is positioned in the axial direction of the input shaft 38 by a nut 44 through two sleeves 39, 41. The cam flange 42 and the input traction disc 26 have opposite cam surfaces confronting each other, and a cam roller 46 is disposed therebetween. The cam roller 46 is so shaped as to produce a force to press the input disc 26 toward the output disc 28 when a relative rotation occurs between the input disc 26 and the cam flange 42. An input traction disc 32 of the second transmission unit 24 is also supported on the hollow shaft 35 through a ball spline coupling 48. The input disc 32 is pressed toward the output disc 34 by a dish plate 51 which receives a compression of a loading nut 50 through a thrust ball bearing 49. The loading nut 50 is engaged with the input shaft 38. The output traction disc 28 of the first transmission unit 22 is rotatably supported on the hollow shaft 35 through a needle bearing 52. Also, the output traction disc 34 of the second transmission unit 24 is rotatably supported on the hollow shaft 35 through a needle bearing 53. Disposed between the two output discs 28, 34 is a sleeve 54 splined to the two output discs 28, 34. The sleeve 54 is formed with a driving gear 55, and held through two angular ball bearings 57, 58. The driving gear 55 is engaged with a follower 60 which is splined to one end of a countershaft 59 in such a manner as to be rotatable with the driving gear 55. The countershaft 59 is arranged in parallel to the input shaft 38. A gear 61 is formed with the other end of the countershaft 59, and engaged with a gear 63 which is in turn integrated with the output shaft 62.

Figure 2:
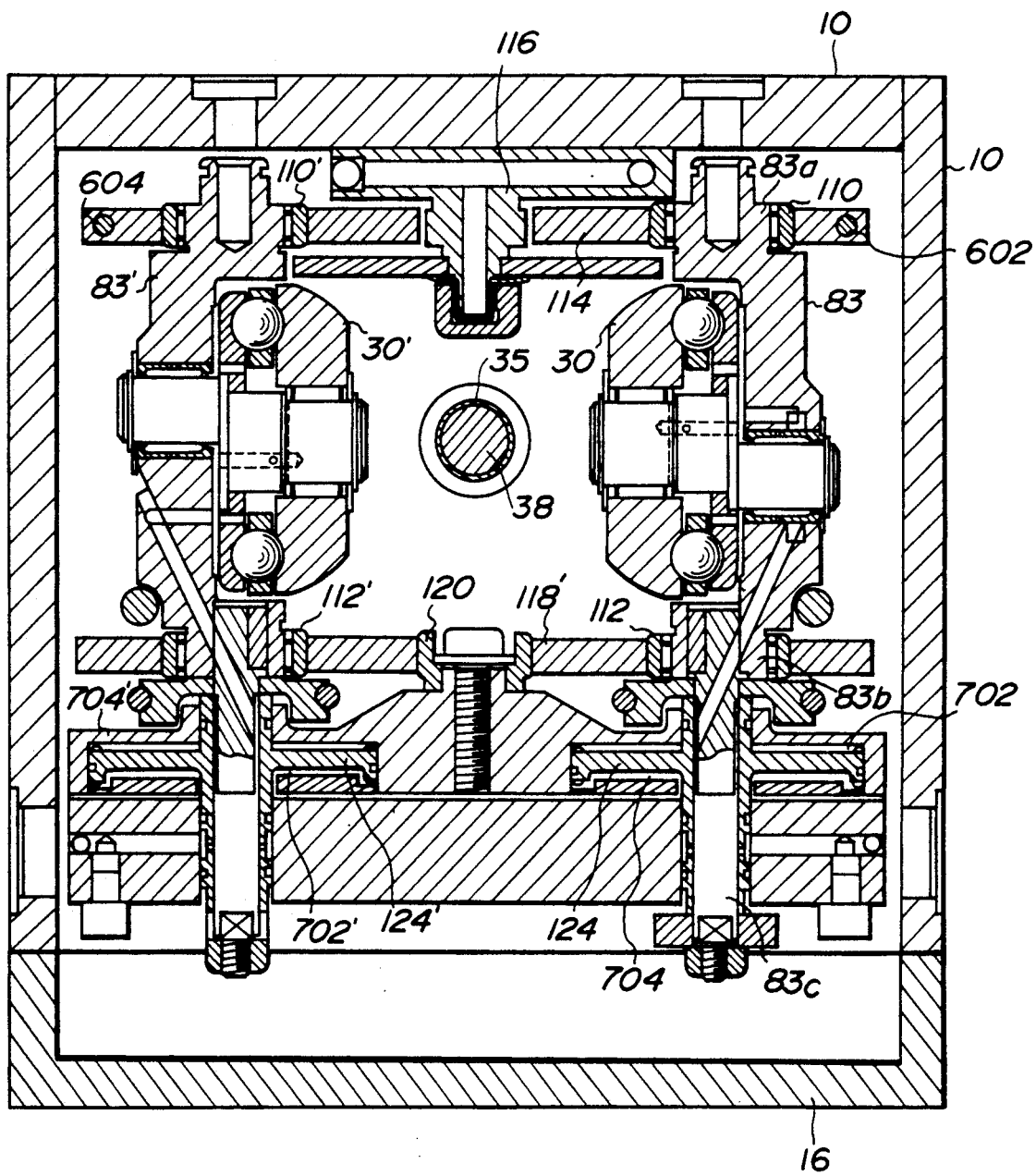
FIG. 2 is a transverse sectional view taken along the line II—II of FIG. 1.

Referring to FIG. 2, a first roller support member 83 includes upper and lower rotatable shaft portions 83a, 83b which are rotatably supported by spherical bearings 110, 112 in such a manner as to be rotatable and slidable in a vertical direction in FIG. 2. The spherical bearing 110 is held by a first upper link 114 which is in turn supported by an upper link post 116 secured to the housing 10. Similarly, the spherical bearing 112 is held by a first lower link 118 which is in turn supported by a lower link post 120. The first roller support member 83 includes an extension shaft portion 83c which is concentric with the lower rotatable shaft portion 83b, and rotatable with this portion 83b. A piston 124 is provided to the outer periphery of the extension shaft portion 83c. Two hydraulic chambers 702, 704 are formed over and under the piston 124 which is vertically movable by a hydraulic pressure supplied to the chambers 702, 704.

On the left side as viewed in FIG. 2 is arranged a second roller support member 83' which has substantially the same structure as the first roller support member 83. A spherical bearing 110' of the second roller support member 83' is connected to the first upper link 114 which is in turn coupled with the spherical bearing 110 of the first roller support member 83. By this, a positional relationship is relatively defined between the first and second roller support members 83, 83', thus inhibiting the first and second members 83, 83' from separating from each other. Similarly, connection of a spherical bearing 112' to the spherical bearing 112 is made by the single first lower link 118.

Figure 3:
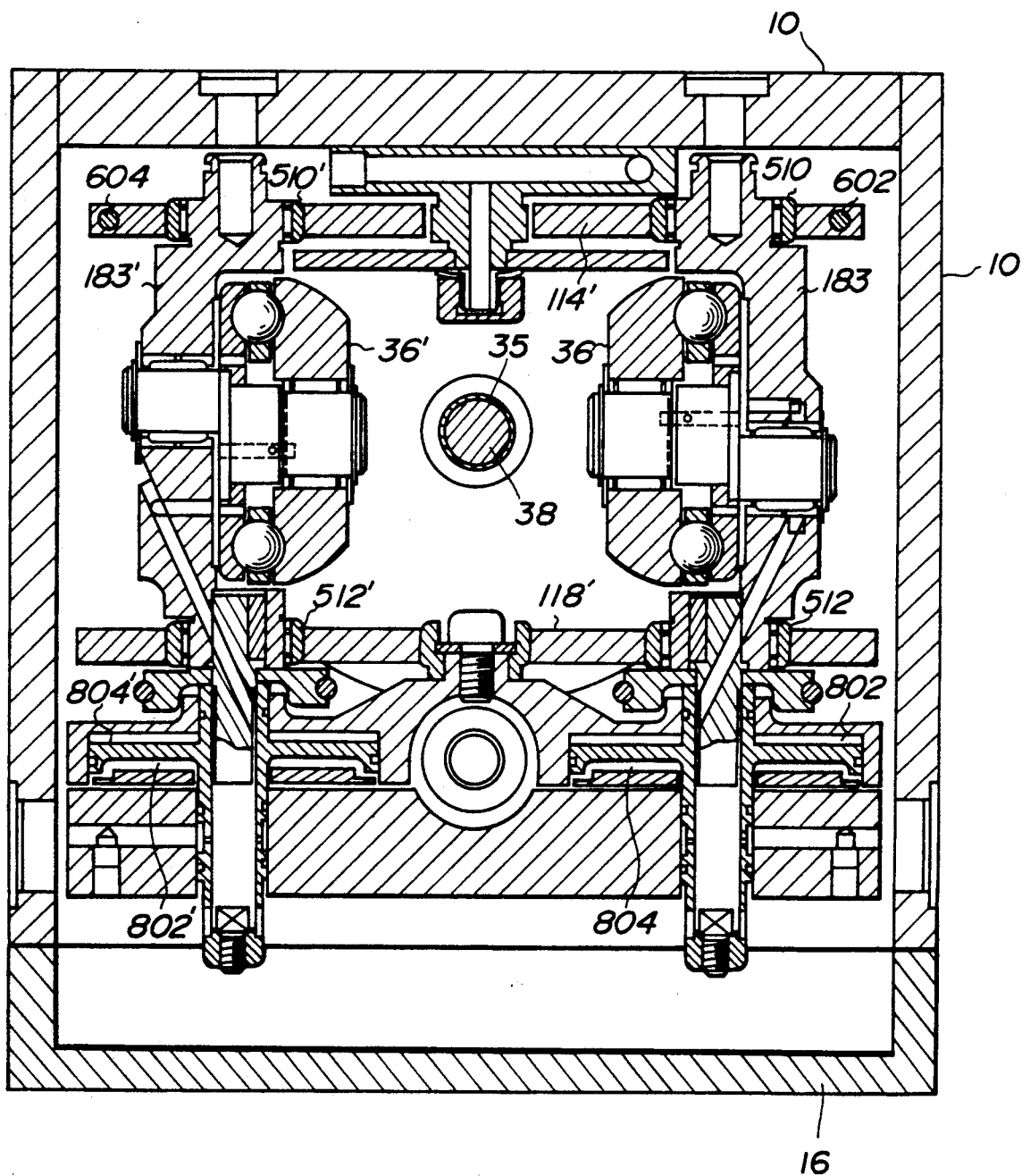
FIG. 3 is a view similar to FIG. 2, but taken along the line III—III of FIG. 1.
Figure 4:
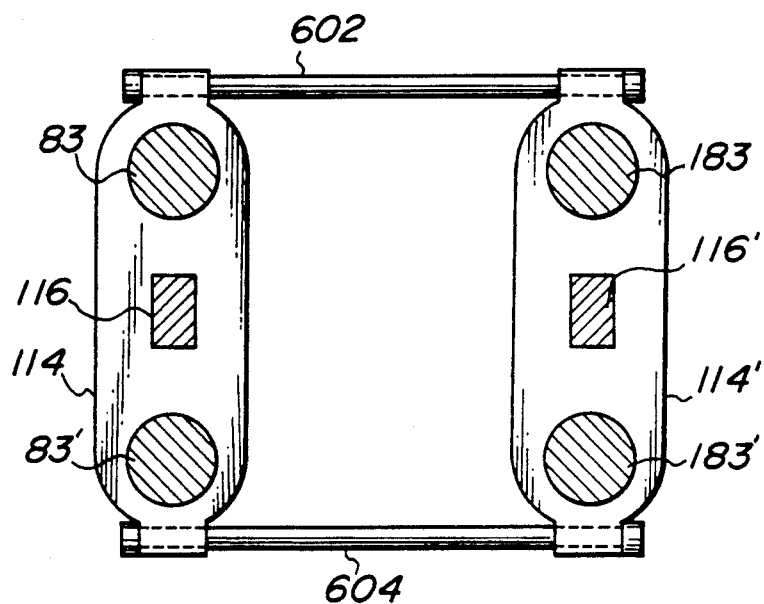
FIG. 4 is a plan view illustrating two upper links, with two rigid rods, of first and second continuously variable transmission units.
Figure 5:
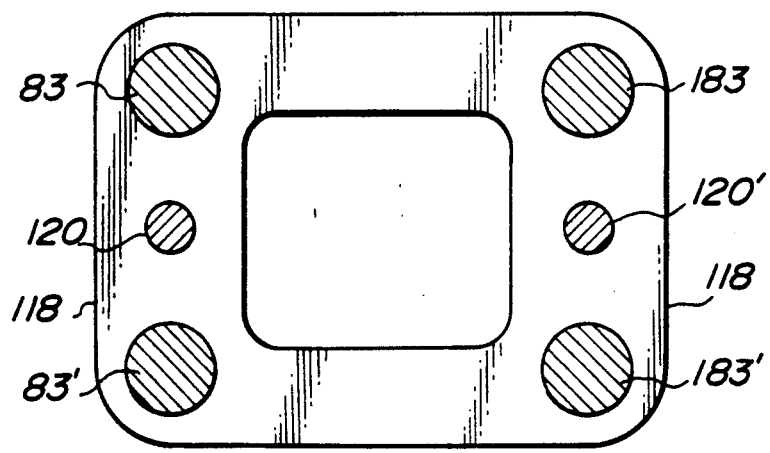
FIG. 5 is a view similar to FIG. 4, but illustrating a lower link of the first and second continuously variable transmission units.

Referring to FIG. 3, the second continuously variable transmission unit 24 includes first and second roller support members 183, 183' which have substantially the same structure as the first continuously variable transmission unit 22 shown in FIG. 2. As shown in FIG. 4, a second upper link 114' connecting a spherical bearing 510 to a spherical bearing 510' is connected to the first upper link 114 by two rigid rods 602, 604 in such a manner as to be movable together. On the other hand, as shown in FIG. 5, a second lower link 118' connecting a spherical bearing 512 to a spherical bearing 512' is integrally formed with the first lower link 118.

Referring to FIG. 6, a shift control valve 150 includes a drive rod 154 which is rotatably driven by a shift motor 152, a sleeve 156, a spool 158 which is slidably received in the sleeve 156, and a spring 160 which biases the spool 158 rightward in FIG. 6. The drive rod 154 has at its leading end an externally threaded head portion which is operatively engaged with an internally threaded bore of the sleeve 156. The sleeve 156 has an axial groove 156b which a screw 163 is engaged with, so that the sleeve 156 is movable axially without rotation. The spool 158 has two lands 158a, 158b by which the opening degree of each port connected the associated one of hydraulic passages 166 and 168 is controlled. A pressure induced by a lever 142 can be inputted to the spool 158. A cam 136 is connected to the roller support member 83, and includes an inclined surface 140. The lever 142 is driven by rotating the cam 136. As shown in FIG. 6, the hydraulic passages 166, 168 are connected to hydraulic chambers 702', 704', 802', and 702, 704, 802, respectively. It is to be noted that the same reference numerals are given to the same hydraulic chambers in FIGS. 2, 3, and 5.

Next, the operation of this embodiment is described. The shift control valve 150 adjusts the distribution of hydraulic pressure between the hydraulic passage 168 on the high-pressure side and the hydraulic passage 166 on the low-pressure side in accordance with the operation of the shift motor 152, thus achieving a predetermined speed ratio. The speed ratio is fed back from the extension shaft portion 83c of the first roller support member 83 to the shift control valve 150 via the cam 136 and the lever 142. In such a condition, when a downward vibration is inputted to the first roller support member 83 of the first continuously variable transmission unit 22, the spool 158 is urged to move to the left as viewed in FIG. 6, and a hydraulic pressure of the hydraulic passage 166 increases. Since the increased pressure acts on the hydraulic chamber 704 in such a manner as to press up the piston 124, the vibration inputted to the first roller support member 83 is restrained. Similarly, when a downward vibration is inputted to the first roller support member 183 of the second continuously variable transmission unit 24, the inputted vibration is transmitted to the first roller support member 83 of the first transmission unit 22 via the link 118' and the rods 602, 604, thus achieving the restraint of the inputted vibration. Accordingly, even if a vibration is inputted to the roller support member of either of the first and second transmission units 22, 24, the inputted vibration is restrained, thus preventing a slippage from occurring only on the second transmission unit 24.

What is claimed is:

1. A continuously variable traction roller transmission comprising:
   a first continuously variable transmission unit including first input and output traction discs, and a pair of first traction rollers interposed between said first input and output traction discs for transmitting a torque therebetween;
   a second continuously variable transmission unit including second input and output traction discs, and a pair of second traction rollers interposed between said second input and output traction discs for transmitting a torque therebetween;
   said first input traction disc being coupled with said second input traction disc, and said first output traction disc being coupled with said second output traction disc;
   a pair of first roller support members supporting said pair of first traction rollers;
   a pair of second roller support members supporting said pair of second traction rollers;
   means for preventing relative movement between said pair of first roller support members and said pair of second roller support members.

2. A continuously variable traction roller transmission as claimed in claim 1, wherein said preventing means include a first link connected between said pair of first roller support members, a second link connected between said pair of second roller support members and two parallel rods interconnecting said first and second links.

3. A continuously variable traction roller transmission as claimed in claim 1, wherein said preventing means include an integral structure with which said pair of first and second support members are coupled.

* * * * *